NEGATIVE FEEDBACK CIRCUIT

Filed March 9, 1959

INVENTOR
*JOHANNES A. KOSTER*

BY
Frank R. Jeifari
AGENT 3,038,125

NEGATIVE FEEDBACK CIRCUIT

Johannes Adrianus Koster, Scarborough, Ontario, Canada, assignor to North American Philips Company, Inc., New York, N.Y., a corporation of Delaware Filed Mar. 9, 1959, Ser. No. 797,920
Claims priority, application Canada Apr. 18, 1958
8 Claims. (Cl. 330—92)

Figure 1:
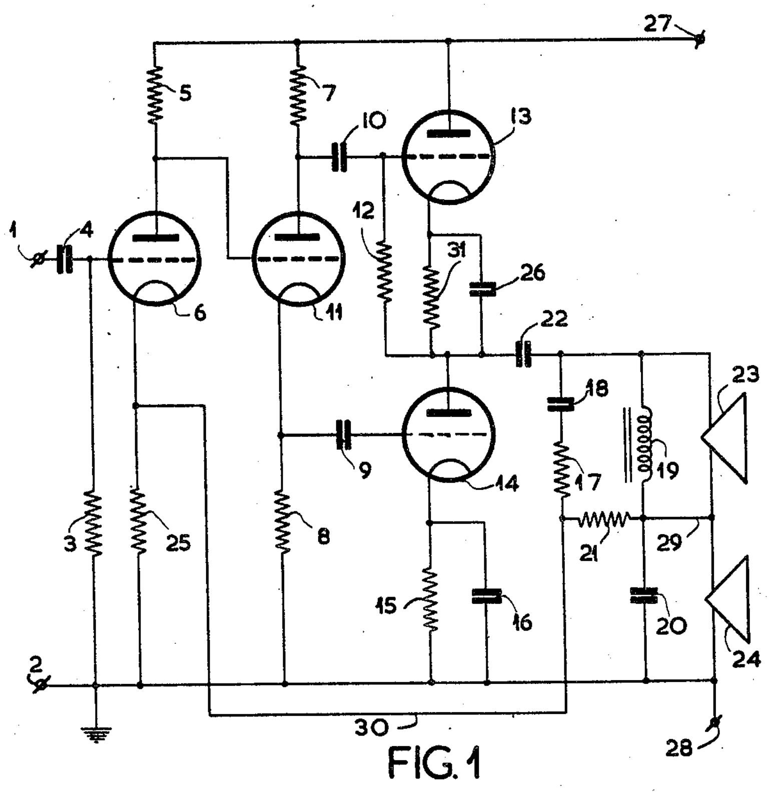

The invention relates to a negative feedback circuit suitable for use in a high quality audio amplifier employing a crossover network in conjunction with a high frequency and low frequency loudspeaker system.

In high quality audio amplifiers using a crossover filter to divide the audio frequencies between the low frequency and high frequency speaker systems, the audio voltages developed across the speakers may not be a true replica of the input to the crossover. Since in prior systems, the negative feedback voltage was derived from the output of the audio power amplifier and corresponds to the input voltage of the crossover filter, the negative feedback was effective to maintain low distortion at this point but this did not necessarily ensure that there would be low distortion at the output of the crossover filter.

Crossover filters in common use employ an inductance capacity network to provide for the necessary frequency division. Crossover distortion is caused primarily by the inductive portion of the network and is usually most prevalent at low frequencies whereat high currents tend to saturate the core of the inductance thus giving rise to non-linear operation. As a consequence, the low frequency audio voltage applied to the low frequency speaker may contain an undue amount of distortion, especially at higher output powers.

The invention takes cognizance of this low frequency distortion and a voltage, at these frequencies, representative of the voltage across the low frequency speaker, is employed for negative feedback and ensures that the low frequency output is relatively free of distortion. The low frequency voltage at the input to the crossover filter will now contain a distortion which offsets or cancels out the distortion produced in the filter.

Figure 2:
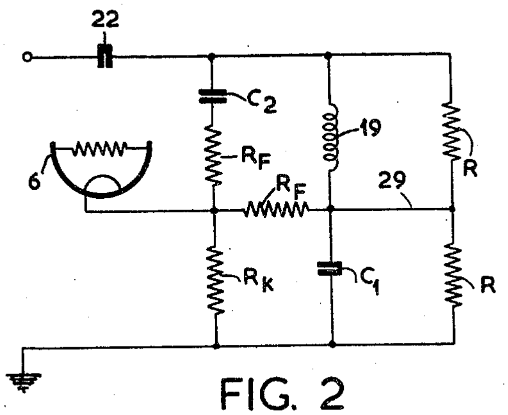

The invention will now be described with reference to the figures of the drawing in which:

FIG. 1 shows the invention incorporated in an amplifier of the single ended push-pull type and FIG. 2 shows an equivalent circuit of the feedback circuit of FIG. 1.

Referring now to FIG. 1, a driver tube 6 is shown having a grid leak resistor 3 and a coupling capacitor 4. Audio signal is applied across input terminals 1 and 2. The cathode of tube 6 is connected to ground by an unbypassed resistor 25. The audio voltage applied to input terminals 1 and 2 is developed across resistor 5 in the anode circuit of tube 6 and applied directly to the control grid of a phase splitter tube 11 feeding the 180° phase shifted outputs through capacitors 9 and 10 to the grids of power amplifier tubes 13 and 14 respectively.

Tubes 13 and 14 are connected in a single ended push-pull arrangement wherein the tubes are connected in series across the power supply, not shown, which has its positive pole connected to terminal 27 and its negative pole grounded by connection to terminal 28.

The output of power tubes 13 and 14 is taken off at the anode of tube 14 and is coupled to a crossover network and speaker system by means of a capacitor 22.

The crossover network comprises an inductance 19, having a magnetic core, in series with a capacitor 20. A low frequency speaker 24 shunts capacitor 20 and a high frequency speaker 23 shunts inductance 19. If we assume the nominal impedance of speakers 23 and 24 are each a value R, then the crossover frequency is represented by the following equation:

$$W_0^2LC_1=1$$

Where $W_0$ is the crossover frequency, L is the inductance of 19 in henries and $C_1$ is the capacity of capacitor 20 in farads.

For the condition of constant impedance of a crossover network, L and $C_1$ are related as by the following equation $$\frac{L}{C_1}=R^2$$

Negative feedback voltage is derived from the network comprisng resistor 17 in series with a capacitor 18 connected to the input of the crossover network and resistor 21 connected between the free end of resistor 17 and a point common to speakers 23, 24, inductance 19 and capacitor 20 as shown. The negative feedback voltage so derived is fed by conductor 30 to the cathode end of resistor 25 associated with tube 6.

In negative feedback circuits known prior to the invention, capacitor 18 and resistance 21 were not employed. Resistor 17 was connected directly to the input to the crossover filter and a portion of the voltage appearing thereon was fed to the cathode of tube 6. As can be seen, the feedback voltage would not necessarily be representative of the low frequency voltage appearing across speaker 24 and as a consequence the low frequency distortion may be unduly high.

In order to overcome the defect found in prior systems, the circuit according to the invention was developed and will now be described with reference to FIGURE 2 of the drawing showing the equivalent circuit thereof.

In FIGURE 2, for the convenience of explanation, the loudspeakers 23 and 24 have been represented as pure resistances R although this is not strictly correct. Capacitor 18 is represented by capacitor $C_2$ and resistor 25 is represented by resistor $R_K$. In order that the voltage feedback be constant for all frequencies resistors 17 and 21 are made equal in value and represented by resistances $R_F$. Assuming that $R_F \gg R_K$ and $R_F \gg R$ then the voltage across capacitor $C_1$ is represented by the following equation:

$$\frac{1}{R}\,\frac{\frac{R}{jwC}}{R+\frac{1}{jwC_1}}V=\frac{1}{1+jwC_1R}V$$

where V is the voltage across the input terminals of the crossover network whose input resistance is also equal to R.

The feedback voltage developed across $R_K$ is then approximately $$\frac{R_K}{R_F}\,\frac{1}{1+jwC_1R}V+\frac{R_K}{R_F+\frac{1}{jwC_2}}V$$

If we let $$C_2=\frac{R}{R_F}C_1$$

then the feedback voltage across $R_K$ is $$\frac{R_K}{R_F}\,\frac{1}{1+jwC_1R}V+\frac{R_K}{R_F}\,\frac{jwC_1R}{1+jwC_1R}V=\frac{R_K}{R_F}V$$

and of the same value for all frequencies providing no extra distortion is introduced by the crossover network. Thus the feedback operation is identical to the circuit wherein components 18 and 21 have been omitted except at low frequencies wherein distortion may be introduced by the crossover network.

Considering now the low frequency feedback operation, and the relationship $$C_2=\frac{R}{R_F}C_1$$

then at the low frequencies the impedance of capacitor $C_2$ is such that it isolates the feedback circuit from the input to the crossover filter. Inductance 19 presents a small impedance to the low frequencies and substantially all the input voltage is developed across speaker 24, the impedance of capacitor $C_1$ being high at the low frequencies with which we are concerned. The feedback voltage now represents the actual voltage developed across low frequency speaker 24 and hence will correct the distortion normally appearing there and caused by, for instance, non-linear effects of inductance 19.

The low frequency voltage feedback will also be $$\frac{R_K}{R_F}V$$

since any loss across inductance 19 will be small in comparison to V.

If components 19 and 20 of FIGURE 1 are interchanged, capacitor 18 must be replaced by an inductance whole value ($L_2$) can be shown, in a similar manner, to be defined by the following equation:

$$L_2=\frac{R_F}{R}L$$

where L is the inductance of 19 and $R_F$ and R are as defined previously in this specification.

A generic equation to cover both conditions is easily determined to be $$Z_2=\frac{R_F}{R}Z_1$$

wherein $Z_2$ is the impedance of the compensating reactance, for example capacitor 18, and $Z_1$ is the impedance of the reactance in the dividing network which has one terminal connected to reference potential, for example capacitor 20.

It will thus be seen that there is developed a negative feedback circuit which is effective to correct the distortion normally appearing in the voltages applied to a low-high frequency speaker system fed by a crossover filter. Although the invention has been described in conjunction with a single ended push-pull amplifier, it should not be construed as being limited to its use therewith. For instance, the crossover network can be employed to drive loads such as telephone lines wherein multi-channel operation is being utilized, the negative feedback being derived in a similar manner. Other modifications may occur, to those skilled in the art, which do not depart from the spirit and scope of the invention covered by the appended claims.

What is claimed is:

1. In an amplifier having input and output circuits wherein one terminal of each of said input and output circuits is at a reference potential, a negative feedback circuit comprising first and second impedances of opposite reactance connected serially across said output circuit to form a onstant impedance frequency dividing network and wherein said second impedance has one terminal thereof connetced to reference potential, first and second substantially resistive loads connected across said first and second impedances respectively, a third reactive impedance and first and second resistors connected in a series circuit across said first impedane so that one of said resistors is connected to the point common to said first and second reactive impedances, a third resistor connetcing the end of said one resistor remote from said common point to reference potential, means feeding the voltage developed across said third resistor to said input as negative feedback voltage when said amplifier is energized and wherein the value of the third reactive impedance $Z_3$ is defined by the following equation $$Z_3=\frac{R_F}{R}Z_2$$

wherein $R_F$ is the resistance of each of said first and second resistors, R is the impedance of each of said network and said loads and $Z_2$ is the impedance of said second reactive impedance.

2. In a negative feedback circuit including an amplifier having input and output circuits wherein one terminal of each of said input and output circuits is at a reference potential, first and second load circuits of substantially equal resistive impedance, a constant impedance frequency dividing network including an inductance and a first capacitor serially connected across said output circuit whereby one terminal of said first capacitor is at reference potential, means connecting said first load circuit across said inductance and said second load circuit across said capacitor, a second capacitor and a first resistor connected in a series circuit wherein one end of said series circuit is connected to the end of the inductance remote from the said first capacitor, a second resistor connecting the common connection between the inductance and first capacitor to the free end of said series circuit, a third resistor connecting said free end to the terminal of the capacitor remote from said inductance and means feeding the voltage developed across said third resistor as a negative feedback voltage to said input circuit.

3. The negative feedback circuit as claimed in claim 2, wherein the capacitance $C_2$ of said second capacitor is defined by the following equation $$C_2=\frac{R}{R_F}C_1$$

wherein said network and said loads each have resistive impedance substantially equal to R, $R_F$ is the value of said fisrt and second resistances and $C_1$ is the capacitance of said first capacitor.

4. In an amplifier having input and output circuits wherein one of the terminals of each of said input and output circuits is at a reference potential, a negative feedback circuit comprising, a constant impedance frequency dividing network including a capacitor and a first inductance connected in series across said output circuit so that one terminal of said first inductance is at reference potential, a second inductance and first and second resistors serially connected across said capacitor so that the free end of said second resistor is connected to a point common to said first inductance and said capacitor, a third resistance connected between the other end of said second resistor and reference potential and means connecting the common point of said second and third resistors to said input circuit to supply negative feedback voltage thereto upon energization of said amplifier.

5. The negative feedback circuit as claimed in claim 4, wherein the second inductance ($L_2$) is defined by the equation $$L_2=\frac{R_F}{R}L$$

wherein said first and second resistors have a value of $R_F$, R is the resistive impedance of each of said network and said loads, and L is the inductance of said first inductance.

6. A negative feedback circuit comprising an amplifier having input and output circuits, first and second load circuits of substantially equal resistive impedance, a constant impedance frequency crossover network, means connecting said crossover network to said output circuit, means connecting said crossover network to said first and second load circuits to supply power in first and second adjacent frequency bands to said first and second load circuits respectively, an impedance in said input circuit, means connected to apply a negative feedback voltage to said impedance representative of the voltage of said output circuit, and means connected to apply a voltage to said impedance representative of the voltage across one of said load circuit means.

7. The circuit of claim 6, in which the lower frequency band power is supplied to said one load circuit means.

8. A negative feedback circuit comprising an amplifier having input and output circuits, first resistance means connected in said input circuit and having one end connected to a reference potential, first and second impedances of opposite reactance connected serially in said output circuit with one end of said second impedance being connected to said reference potential, first and second substantially resistive load means connected in parallel with said first and second impedances respectively, a series circuit of a third reactive impedance and second and third resistance means, said series circuit connected in parallel with said first impedance, said second and third resistance means having equal resistances and substantially greater than the resistance of said first resistance means and said first and second load means, one end of said second resistance means being connected to the junction of said first and second impedances, and means connecting the other ends of said first and second resistance means, said third impedance $Z_3$ having a value:

$$Z_3 = \frac{R_F}{R} Z_2$$

where $R_F$ is the resistance of said second and third resistance means, R is the resistance of said first and second load means, and $Z_2$ is the impedance of said second impedance.

References Cited in the file of this patent

UNITED STATES PATENTS

| | | |
|---|---|---|
| 2,221,116 | Six | Nov. 12, 1940 |
| 2,289,752 | Bruck | July 14, 1942 |
| 2,367,110 | Fayer | Jan. 9, 1949 |
| 2,611,833 | Roche | Sept. 23, 1952 |
| 2,627,931 | Flewelling | Feb. 10, 1953 |
| 2,633,528 | Hutson | Mar. 31, 1953 |
| 2,661,398 | Cooper | Dec. 1, 1953 |
| 2,764,643 | Sulzer | Sept. 25, 1956 |
| 2,777,020 | Dubosy | Jan. 8, 1957 |